Sept. 1, 1964     S. EPSTEIN     3,147,454
DIFFERENTIAL PRESSURE TRANSDUCER
Filed March 14, 1962
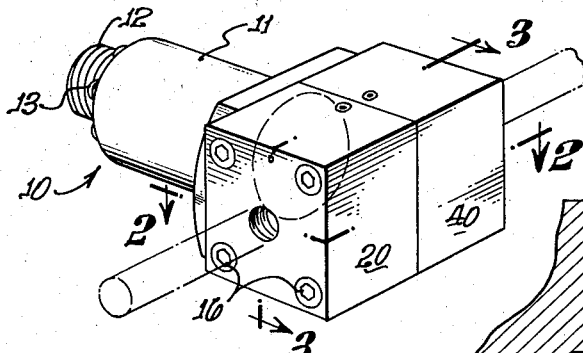
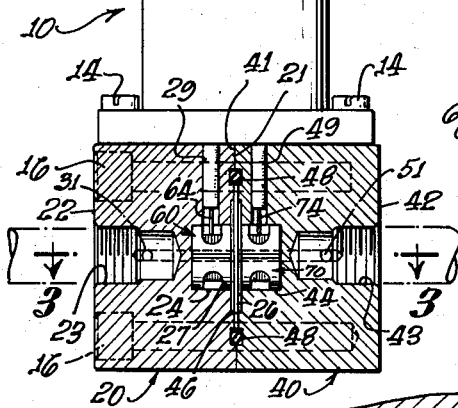
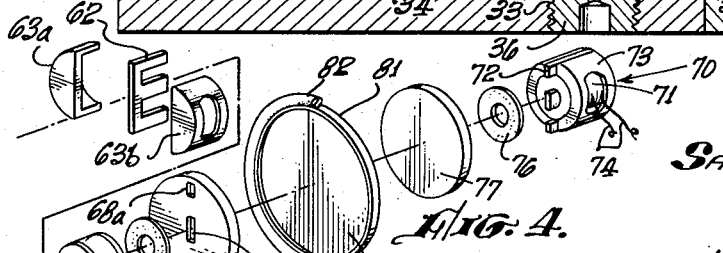
SAUL EPSTEIN,
INVENTOR.
BY HIS ATTORNEYS.
Spensley & Horn.

United States Patent Office 3,147,454
Patented Sept. 1, 1964

3,147,454
DIFFERENTIAL PRESSURE TRANSDUCER
Saul Epstein, 5015 Varna Ave., Sherman Oaks, Calif.
Filed Mar. 14, 1962, Ser. No. 179,718
6 Claims. (Cl. 336—20)

This invention relates to pressure responsive devices and more particularly to differential pressure transducers.

Differential pressure transducers are in common use for the measurement of fluid pressure differentials. However, at the present state of the art, such differential pressure transducers cannot measure very small pressure differentials at high line pressures, for example, a full scale differential pressure on the order of 0.1 p.s.i.d. at line pressures of up to 5,000 p.s.i.

Accordingly, it is an object of the present invention to provide improved differential pressure transducers.

It is also an object of the present invention to provide extremely sensitive differential pressure transducers.

It is another object of the present invention to provide extremely sensitive differential pressure transducers for operation at high line pressures.

In accordance with the presently preferred embodiment of this invention, there is provided a thin diaphragm of magnetic material, dividing a central aperture within a pressure-tight housing, into two sections. Mounted within each section is a pick-off coil assembly including a bobbin wound wire coil mounted on an E-shaped laminated core, the coil and core being potted within a cup-shaped coil receptacle with the tips of the extending leg portions of the core projecting from the open end of the cup toward the diaphragm. Also mounted within each section of the central aperture is a coil cover plate of a non-magnetic material disposed between the pick-off coil assembly and the diaphragm, the coil cover being in parallel alignment with the diaphragm and spaced therefrom a predetermined distance. The side of the coil cover facing the pickoff coil assembly has three spaced-apart generally rectangular depressions to accommodate the projecting tips of the extending leg portions of the coil cores without actually contacting the coil cores. The coil covers are peripherally sealed to the housing to define pressure chambers between the coil covers and the diaphragm. The housing is provided with suitable pressure ports communicating between the exterior surfaces of the housing and the pressure chambers, the termination of the pressure ports in the exterior surfaces of the housing being adapted for coupling to fluid carrying lines. Upon coupling of fluid carrying lines to the pressure ports of the transducer, the diaphragm is then bowed or displaced in accordance with pressure differentials between the pressure chambers. Due to the close proximity of the pickoff coil assemblies to the magnetic diaphragm, the diaphragm forms a portion of the magnetic circuit of the coil assemblies, movement of the diaphragm resulting in a change in the inductances of the coils due to variation of the reluctance of the magnetic circuits. The coils are wired into opposite legs of a bridge circuit by means of which changes in the inductance ratio of the two coils provides a bridge output voltage proportional to differential pressure. The novel form of the coil covers enables measurement of minute pressure differentials due to the generally rigid construction while still maintaining the necessary thin layer of non-magnetic material immediately over the projecting tips of the coil cores to enable completion of the magnetic circuit through the diaphragm, i.e. the coil cover must be thin over the coil core in order to avoid an excessive reduction in sensitivity.

The novel features which are believed to be characteristic of the present invention, both as to its organization and mode of operation, together with further objects and advantages thereof will be better understood from the following description considered in connection with the accompanying drawing. It is to be expressly understood, however, that the drawing is for the purpose of illustration and example only, and is not intended as a definition of the limits of the invention.

In the drawing:

FIGURE 1 is a perspective view of a differential pressure transducer in accordance with a presently preferred embodiment of the invention;

FIGURE 2 is an elevational view of the transducer of FIGURE 1, partially in section along the line 2—2 of FIGURE 1;

FIGURE 3 is an enlarged view taken along the line 3—3 of FIGURE 2; and,

FIGURE 4 is an exploded view of the pickoff coil assemblies and the coil covers positioned at either side of a central diaphragm.

Referring to the drawing, wherein like reference characters designate like or corresponding parts throughout the various views, there is illustrated the presently preferred embodiment of the transducer of the present invention as an assembled unit without the associated electrical bridge circuitry. In the illustrated embodiment, it is assumed for purposes of clarity and description only that the device is employed to measure hydraulic differential pressure. It is to be understood, however, that this device may be applicable for measuring the differential pressure between any type of fluids or combinations thereof. For example, the device may be utilized to measure the differential pressure between a liquid and a gas as well as between different liquids.

Turning now to FIGURES 1 and 2 of the drawing, the differential pressure transducer, indicated generally by the reference numeral 10, is comprised generally of main housing portions 20 and 40 assembled to provide a generally rectangular transducer housing having extending therefrom a cylindrical housing 11. The cylindrical housing 11 contains the electrical bridge circuitry, which circuitry forms no part of the present invention and hence will not be discussed in detail, together with an appropriate electrical connector 12. The electrical connector 12 is mounted to the end of the cylindrical housing 11 by a plurality of screws 13. The cylindrical housing 11 is mounted to the transducer housing by a plurality of screws 14. The housing portions 20 and 40 comprising the body of the transducer are held in an assemblage by a plurality of countersunk screws 16.

The housing portion 20 is constructed from a rectangular metal block, and has two opposing faces designated as an inner face 21 and an outer face 22. Extending through the housing portion 20, between the inner face 21 and the outer face 22, are four countersunk holes to freely receive the mounting screws 16, the countersunk portion of the holes being adjacent to the outer face 22. A threaded aperture 23 extends inwardly from the outer face 22 for connection of a fluid carrying line or pressure fitting to the housing portion 20. Centrally located in the inner face 21 of the housing portion 20 is a cylindrical aperture 24. Surrounding the cylindrical aperture 24 and countersunk in successive degrees from the face 21 are a series of contiguous annular depressions 25–28. The depression 25 is the deepest of the depressions 25–28 and it is contiguous with the aperture 24. The shallower depression 26 surrounds the depression 25 and is contiguous therewith. The still shallower depression 27 surrounds the depression 26 and is contiguous therewith. Surrounding the depression 27 and contiguous therewith is the deeper depression 28 of rectangular cross-section. A pair of insulating sleeves 29 extend upwardly through cylindrical apertures communicating between the peripheral surface of the cylindrical aperture 24 and the upper surface of the housing portion 20.

A pressure port 31 communicates between the interior of the threaded aperture 23 and the shallow depression 26, as can best be seen in FIGURE 3. A generally horizontally extending bleed path is defined by a passageway 32, a threaded aperture 33 and a passageway 34. The passageway 32 terminates near the edge of the shallow depression 26 diametrically opposite from the termination of the pressure port 31 and communicates with the bottom of the threaded aperture 33. The threaded aperture 33 extends inwardly from a side surface of the housing portion 20 and has threaded therein a plug 36 having a neoprene tip 37 thereon to provide a pressure-tight seal of the passageway 32 when the plug 36 is screwed all the way into the aperture 33. The passageway 34 extends between a side surface of the housing portion 20 and the peripheral surface of the threaded aperture 33. By partially unscrewing the plug 36 a sufficient distance to uncover a portion of the passageway 34, an effective bleeding arrangement is provided as will be explained hereinbelow.

The housing portion 40 is constructed from a rectangular metal block and is of an identical size to the housing portion 20. The housing portion 40 has two opposing faces designated as an inner face 41 and an outer face 42. Extending inwardly into the housing portion 40 from the inner face 41 are four threaded holes to receptively engage the mounting screws 16 when the housing portions 20 and 40 are assembled with the inner faces 21 and 41 in contact. With the exception of the threaded holes for reception of the mounting screws 16 the housing portion 40 is constructed as a mirror image of the housing portion 20. A threaded aperture 43 extends inwardly from the outer face 42 for connection of a fluid carrying line or pressure fitting to the housing portion 40. Centrally located in the inner face 41 of the housing portion 40 is a cylindrical aperture 44, as can best be seen from FIGURE 3. Surrounding the cylindrical aperture 44 and countersunk in successive degrees from the face 41 are a series of contiguous annular depressions 45–48. The depression 45 is the deepest of the depressions 45–48 and it is contiguous with the aperture 44. The shallower depression 46 surrounds the depression 45 and is contiguous therewith. The still shallower depression 47 surrounds the depression 46 and is contiguous therewith. Surrounding the depression 47 and contiguous therewith is the deeper annular depression 48 of rectangular cross section. A pair of insulating sleeves 49 extend upwardly through cylindrical apertures communicating between the peripheral surface of the cylindrical aperture 44 and the upper surface of the housing portion 40.

A pressure port 51 communicates between the interior of the threaded aperture 43 and the shallow depression 46, the pressure port 51 extending in a horizontal direction and terminating near one edge of the shallow depression 46 as can best be seen in FIGURE 3. A generally horizontally extending bleed path is defined by a passageway 52, a threaded aperture 53 and a passageway 54. The passageway 52 terminates near the edge of the shallow depression 46 opposite from the termination of the pressure port 51 and communicates with the bottom of the threaded aperture 53. The threaded aperture 53 extends inwardly from a side surface of the housing portion 40 and has threaded therein a plug 56 having a neoprene tip 57 thereon to provide a pressure-tight seal of the passageway 52 when the plug 56 is screwed all the way into the aperture 53. The passageway 54 extends between a side surface of the housing portion 40 and the peripheral surface of the threaded aperture 53. Movement of the plug 56 provides a bleeding effect similar to that of the plug 36.

Mounted within the cylindrical aperture 24 in the housing portion 20 is a pick-off coil assembly 60. As can best be seen from the exploded view of FIGURE 4, the pick-off coil assembly 60 includes a bobbin wound wire coil 61 mounted on an E-shaped laminated core 62, the core being sandwiched between two halves of a cup-shaped coil receptacle 63, the individual halves of the receptacle being indicated by the reference numerals 63a and 63b. The coil 61 is potted within the receptacle 63 with the coil leads 64 projecting through an aperture in the peripheral surface of the receptacle 63 and extending upwardly through the sleeves 29 into the housing 11 where the leads 64 are connected into the electrical circuitry of the transducer. An identical pick-off coil assembly 70 is mounted within the aperture 44 in the housing portion 40, the pick-off coil assembly 70 including a coil 71, a core 72, a coil receptacle 73, and extending coil leads 74. The electrical leads 74 project through an aperture in the peripheral surface of the receptacle 73 and extend upwardly through the sleeves 49 into the housing 11 where they are connected into the transducer electrical circuitry. The tips of the extending leg portions of the cores 62 and 72 project from the open end of the cup shaped receptacles 63 and 73, as can best be seen from the pick-off coil assembly 70 of FIGURE 4. An annular washer 76, of flexible material such as felt or rubber, is fit over the coil 74 and is flush with the open end of the coil receptacle 73. A similar annular washer 66 is mounted to the coil assembly 60.

Mounted within the shallow depression 25 in the housing portion 20 is a disc-shaped, non-magnetic, coil cover plate 67. The cover plate 67 has three spaced apart apertures extending partially therethrough, the apertures being designated by the reference numerals 68a, 68b and 68c. The apertures 68a, 68b and 68c extend into the cover plate 67 a predetermined distance slightly greater than the distance that the tips of the extending leg portions of the core 62 project from the open end of the receptacle 63, the apertures being slightly greater in size than the projecting core tips. Thus, the projecting core tips extend into the apertures 68a, 68b, 68c without making physical contact with the coil cover 67. A coil cover 77 identical to the coil cover 67, is positioned within the shallow depression 45 in the housing portion 40, the projecting tips of the core 72 extending into apertures 78a, 78b and 78c without making physical contact therewith. The coil cover plates 67 and 77 are constructed of nonmagnetic stainless steel or other suitable non-magnetic material, the thickness of the covers being identical with the thickness of the shallow depressions 25 and 45 so that the cover plates are flush with the surfaces of the shallow depressions 26 and 46. The coil cover plates 67 and 77 are sealed within the shallow depressions 25 and 45, and the coil leads 64 and 74 are sealed within the sleeves 29 and 49. Hence, the cylindrical apertures 24 and 44, and the coil assemblies contained therein are completely isolated from any fluids within the transducer.

A thin diaphragm 80, constructed of a magnetic stainless steel or other suitable magnetic material, is positioned between the inner faces of the housing portions 20 and 40 within the space formed by the shallow depressions 27 and 47, and coextensive therewith. Positioned between the space formed between the annular depressions 28 and 48 are a diaphragm locating ring 81 and a sealing O-ring 82. A diaphragm locating ring 81 is in the form of a metal ring having a thickness slightly less than that of the annular space formed by the shallow depressions 28 and 48 when the housing portions 20 and 40 are assembled. The purpose of the diaphragm locating ring 81 is to facilitate assemblage of the unit by maintaining the diaphragm 80 in proper alignment between the surfaces defining the shallow depressions 27 and 47. The sealing ring 82 is a neoprene or rubber O-ring which is compressed between the inner faces of the housing portions 20 and 40 when they are assembled into a unit, the compression of the sealing ring 82 thereby providing a pressure tight seal surrounding the diaphragm 80. The housing portions 20 and 40 can be easily assembled by placing the diaphragm locating ring 81 and the sealing ring 82 within the depression 48 in the inner face 41 of the housing portion 40, and then positioning the diaphragm 80 within the shallow depression 47. The inner face 21 of the housing portion 20 is then brought into mating alignment with the inner face 41 of the housing section 40 and the screws 16 are inserted into the proper holes and threaded into the body portion 40. The screws are tightened until the inner faces 21 and 41 are in planar contact, the surfaces defining the depressions 27 and 47 then tightly clamping the diaphragm 80 about its periphery, and the sealing ring 82 then being tightly compressed to provide the desired pressure-tight seal.

Upon assemblage of the housing portions 20 and 40 into a transducer housing, a pressure chamber is formed in each of the housing portions 20 and 40. The pressure chambers are disc shaped and very thin, the pressure chamber within the housing portion 20 being bounded by the diaphragm 80 on one side and by the planer surface of the coil cover plate 67 on the other, the pressure chamber formed within the housing portion 40 being bounded on one side by the diaphragm 80 and on the other by the planar surface of the coil cover plate 77. In operation, with suitable pressure lines coupled to the threaded apertures 23 and 43 and with fluid pressure applied thereto, the pressure chamber within the housing portion 20 will be filled with fluid through the pressure port 31 and the pressure chamber within the housing portion 40 will be filled with fluid through the pressure port 51. The plugs 36 and 56 are partially unscrewed to allow the fluid pressure within the pressure chambers to eject any entrapped air through the passageways 34 and 54 to the ambient atmosphere. The plugs 36 and 56 are then screwed in until the plug tips 37 and 57 seal off the passageways 32 and 52.

To adjust the transducer for operation equal pressures are created within the pressure chambers on either side of the diaphragm, and the electrical bridge circuit is adjusted for a balanced condition. Thereafter, any differential pressure occurring between the two pressure chambers will cause distortion or bowing of the diaphragm 80 toward the side having the lower pressure. The sealing ring 82 provides an effective pressure-tight seal without excessive bolt or screw strain as with common compression gaskets. The screws 16 need be tightened only enough to obtain metal-to-metal contact between the inner faces of the housing portions. No special care in tightening the screws uniformly is needed as with common gaskets. Once the sealing ring is properly installed, the operating pressure itself maintains the seal. The novel construction of the coil cover plates 67 and 77 provides an extremely thin portion adjacent the tips of the projecting legs of the coil cores to allow completion of the magnetic flux paths through the diaphragm while providing sufficient thickness throughout the remainder of the coil covers to insure against deformation of the coil covers due to operating pressure.

In a practical operational example of the illustrated embodiment, the housing portions 20 and 40 are constructed of type 416 stainless steel, the coil cover plates 67 and 77 constructed of nonmagnetic type 303 stainless steel, the coil covers being welded to the housing portions, and the diaphragm 80 constructed of type 430 rolled sheet stainless steel, the diaphragms being stress relieved by appropriate heat treatment. Utilizing a nominal inductance of 20 millihenrys for each of the coils 6 and 71, together with a maximum excitation voltage of thirty volts at 3000 cycles per second a full scale output of fifty millivolts per volt is readily obtainable together with a volumetric displacement of $3 \times 10^{-4}$ cubic inch full scale. The illustrated embodiment will provide pressure transducers having ranges varying from 0–0.1 p.s.i.d. to 0–2500 p.s.i.d., with a linearity of approximately plus or minus 0.5%.

Thus, there has been described differential pressure transducers capable of measuring very small pressure differentials at very high line pressures. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:
1. A differential pressure transducer comprising, in combination:
   (a) a pressure-tight housing defining a central aperture therein and first and second spaced apart pressure ports communicating between an exterior surface of said housing and said central aperture, the termination of each of said first and second pressure ports in an exterior surface of said housing including coupling means for the pressure-tight coupling thereto of fluid carrying lines;
   (b) a flexible diaphragm of magnetic material disposed within said central aperture in said housing and peripherally sealed thereto to thereby divide said central aperture into first and second sections, said first pressure port terminating in said first section at a point adjacent said diaphragm and said second pressure port terminating in said second section at a point adjacent said diaphragm;
   (c) a first pick-off coil assembly mounted within the first section of said central aperture, said first pick-off coil assembly comprising a first coil wound on a core of magnetic material and having an end portion extending toward said diaphragm, said first pick-off coil assembly including means for coupling said first coil to a source of energizing current to establish a magnetic flux field;
   (d) a first coil cover, said first coil cover consisting of a plate of non-magnetic material mounted within the first section of said central aperture of said housing between said first pick-off coil assembly and said diaphragm, said first coil cover having first and second parallel side surfaces, said first side surface of said first coil cover being in parallel alignment with said diaphragm and spaced apart therefrom, said second side surface of said first coil cover defining a depression therein with the projecting end portion of said first core disposed within said depression and spaced therefrom by an air gap, said first coil cover being peripherally sealed to said housing to thereby define a first pressure chamber between said first coil cover and said diaphragm with said first pressure port terminating within said first pressure chamber, the spacing between said first pick-off coil assembly and said diaphragm being sufficiently close so that said diaphragm is within the magnetic field of said first coil and is a part of the magnetic circuit thereof;
   (e) a second pick-off coil assembly mounted within the second section of said central aperture, said second pick-off coil assembly comprising a second coil wound on a core of magnetic material having an end portion extending toward said diaphragm, said second pick-off coil assembly including means for coupling said second coil to a source of energizing current to establish a magnetic flux field; and,
   (f) a second coil cover, said second coil cover consisting of a plate of non-magnetic material mounted within the second section of said central aperture of said housing between said pick-off coil assembly and said diaphragm, said second coil cover having first and second parallel side surfaces, said first side surface of said second coil cover being in parallel alignment with said diaphragm and spaced apart therefrom, said second side surface of said second coil cover defining a depression therein with the projecting end portion of said second core disposed within said depression and spaced therefrom by an air gap, said second coil cover being peripherally sealed to said housing to thereby define a second pressure chamber between said second coil cover and said diaphragm with said second pressure port terminating within said second pressure chamber, the spacing between said second pick-off coil assembly and said diaphragm being sufficiently close so that said diaphragm is within the magnetic field of said second coil and is a part of the magnetic circuit thereof.

2. A differential pressure transducer comprising, in combination:

(a) a pressure-tight housing defining a central aperture therein and first and second spaced apart pressure ports communicating between an exterior surface of said housing and said central aperture, the termination of each of said first and second pressure ports in an exterior surface of said housing including coupling means for the pressure-tight coupling thereto of fluid carrying lines;

(b) a flexible diaphragm of magnetic material disposed within said central aperture in said housing and peripherally sealed thereto to thereby divide said central aperture into first and second sections, said first pressure port terminating in said first section at a point adjacent said diaphragm and said second pressure port terminating in said second section at a point adjacent said diaphragm;

(c) a first pick-off coil assembly mounted within the first section of said central aperture, said first pick-off coil assembly consisting of a first core of magnetic material having a base portion and central and end leg portions extending from said base portion toward said diaphragm and a first wire coil wound around the central leg portion and between the end leg portions of said first core, said first pick-off coil assembly including means for coupling said first coil to a source of energizing current to establish a magnetic flux field;

(d) a first coil cover, said first coil cover consisting of a plate of non-magnetic material mounted within the first section of said central aperture of said housing between said first pick-off coil assembly and said diaphragm, said first coil cover having first and second parallel side surfaces, said first side surface of said first coil cover being in parallel alignment with said diaphragm and spaced apart therefrom, said second side surface of said first coil cover defining three spaced apart substantially rectangular depressions therein with a projecting tip of each one of the extending leg portions of said first core disposed within a different one of said depressions and spaced therefrom by an air gap, said first coil cover being peripherally sealed to said housing to thereby define a first pressure chamber between said first coil cover and said diaphragm with said first pressure port terminating within said first pressure, the spacing between said first pick-off coil assembly and said diaphragm being sufficiently close so that said diaphragm is within the magnetic field of said first coil and is a part of the magnetic circuit thereof;

(e) a second pick-off coil assembly mounted within the second section of said central aperture, said second pick-off coil assembly consisting of a second core of magnetic material having a base portion and central and end leg portions extending from said base portion toward said diaphragm and a second wire coil wound around the central leg portion and between the end leg portions of said second core, said second pick-off coil assembly including means for coupling said second coil to a source of energizing current to establish a magnetic flux field; and, (f) a second coil cover, said second coil cover consisting of a plate of non-magnetic material mounted within the second section of said central aperture of said housing between said second pick-off coil assembly and said diaphragm, said second coil cover having first and second parallel side surfaces, said first side surface of said second coil cover being in parallel alignment with said diaphragm and spaced apart therefrom, said second side surface of said second coil cover defining three spaced apart substantially rectangular depressions therein with a projecting tip of each one of the extending leg portions of said second core disposed within a different one of said depressions and spaced therefrom by an air gap, said second coil cover being peripherally sealed to said housing to thereby define a second pressure chamber between said second coil cover and said diaphragm with said second pressure ports terminating within said second pressure chamber, the spacing between said second pick-off coil assembly and said diaphragm being sufficiently close so that said diaphragm is within the magnetic field of said second coil and is a part of the magnetic circuit thereof.

3. A differential pressure transducer comprising, in combination:

(a) a pressure-tight housing defining a central aperture therein and first and second spaced apart pressure ports communicating between an exterior surface of said housing and said central aperture, the termination of each of said first and second pressure ports in an exterior surface of said housing including coupling means for the pressure-tight coupling thereto of fluid carrying lines;

(b) a flexible diaphragm of magnetic material disposed within said central aperture in said housing and peripherally sealed thereto to thereby divide said central aperture into first and second sections, said first pressure port terminating in said first section at a point adjacent said diaphragm and said second pressure port terminating in said second section at a point adjacent said diaphragm;

(c) a first pick-off coil assembly mounted within the first section of said central aperture, said first pick-off coil assembly consisting of a first core of magnetic material having a base portion and central and end leg portions extending from said base portion toward said diaphragm, a first wire coil wound around the central leg portion and between the end leg portions of said first core, and a first substantially cup-shaped coil receptacle encompassing said coil with the base portion of said first coil core disposed at the closed end of the cup and with the tips of the extending leg portions of said first coil core projecting from the open end of the cup, said first pick-off coil assembly including means for coupling said first coil to a source of energizing current to establish a magnetic flux field;

(d) a first coil cover, said first coil cover consisting of a plate of non-magnetic material mounted within the first section of said central aperture of said housing between said first pick-off assembly and said diaphragm, said first coil cover having first and second parallel side surfaces, said first side surface of said first coil cover being in parallel alignment with said diaphragm and spaced apart therefrom, said second side surface of said first coil cover defining three spaced apart substantially rectangular depressions therein with a projecting tip of each one of the extending leg portions of said first core disposed within a different one of said depressions and spaced therefrom by an air gap, said first coil cover being peripherally sealed to said housing to thereby define a first pressure chamber between said first coil cover and said diaphragm with said first pressure port terminating within said first pressure chamber, the spacing between the tips of the extending leg portions of said first coil core and said diaphragm being sufficiently close so that said diaphragm is within the magnetic field of said first coil to form a part of the magnetic circuit thereof;

(e) a second pick-off coil assembly mounted within the second section of said central aperture, said second pick-off coil assembly consisting of a second core of magnetic material having a base portion and central and end leg portions extending from said base portion toward said diaphragm, a second wire coil wound around the central leg portion and between the end leg portions of said second core, and a second substantially cup-shaped receptacle encompassing said coil with the base portion of said second coil core disposed at the closed end of the cup and with the tips of the extending leg portions of said second coil core projecting from the open end of the cup, said second pick-off coil assembly including means for coupling said second coil to a source of energizing current to establish a magnetic flux field; and (f) a second coil cover, said second coil cover consisting of a plate of non-magnetic material mounted within the second section of said central aperture of said housing between said second pick-off coil assembly and said diaphragm, said second coil cover having first and second parallel side surfaces, said first side surface of said second coil cover being in parallel alignment with said diaphragm and spaced apart therefrom, said second side surface of said second coil cover defining three spaced apart substantially rectangular depressions therein with a projecting tip of each one of the extending leg portions of said second core disposed within a different one of said depressions and spaced therefrom by a small air gap, said second coil cover being peripherally sealed to said housing to thereby define a second pressure chamber between said second coil cover and said diaphragm with said second pressure ports terminating within said second pressure chamber, the spacing between the tips of the extending leg portions of said second coil core and said diaphragm being sufficiently close so that said diaphragm is within the magnetic field of said second coil to form a part of the magnetic circuit thereof.

4. A differential pressure transducer comprising in combination:

(a) a pressure-tight housing defining a central aperture therein and first and second spaced apart pressure ports communicating between an exterior surface of said housing and said central aperture, the termination of each of said first and second pressure ports in an exterior surface of said housing including coupling means for the pressure tight coupling thereto of fluid carrying lines;

(b) a flexible diaphragm of magnetic material disposed within said central aperture in said housing and peripherally sealed thereto to thereby divide said central aperture into first and second sections, said first pressure port terminating in said first section at a point adjacent said diaphragm and said second pressure port terminating in said second section at a point adjacent said diaphragm;

(c) a first pick-off coil assembly mounted within the first section of said central aperture, said first pick-off coil assembly consisting of the first core of magnetic material having a base portion and a central and end leg portions extending from said base portion toward said diaphragm, a first wire coil wound around the central leg portion and between the end leg portions of said first core, and a first substantially cup-shaped receptacle encompassing said coil with said coil being potted therein by an organic potting compound with the base portion of said first coil core disposed at the closed end of the cup and with the tips of the extending leg portions of said first coil core projecting from the open end of the cup, said first pick-off coil assembly including means for coupling said first coil to a source of energizing current to establish a magnetic flux field;

(d) a first coil cover, said first coil cover consisting of a plate of non-magnetic material mounted within the first section of said central aperture of said housing between said first pick-off coil assembly and said diaphragm, said first coil cover having first and second parellel side surfaces, said first side surface of said first coil cover being in parallel alignment with said diaphragm and spaced apart therefrom, said second side surface of said first coil cover defining three spaced apart substantially rectangular depressions therein with a projecting tip of each one of the extending leg portions of said first core disposed within a different one of said depressions and spaced therefrom by an air gap, said first coil cover being peripherally sealed to said housing to thereby define a first pressure chamber between said first coil cover and said diaphragm with said first pressure port terminating within said first pressure chamber, the spacing between the tips of the extending leg portions of said first coil core and said diaphragm being sufficiently close so that said diaphragm is within the magnetic field of said first coil to form a part of the magnetic circuit thereof;

(e) a second pick-off coil assembly mounted within the second section of said central aperture, said second pick-off coil assembly consisting of a second core of magnetic material having a base portion and central and end leg portions extending from said base portion toward said diaphragm, a second wire coil wound around the central leg portion and between the end leg portions of said second core, and a second substantially cup shaped coil receptacle encompassing said coil with said coil being potted therein by an organic potting compound and with the base portion of said second coil disposed at the closed end of the cup and with the tips of the extending leg portions of said second coil core projecting from the open end of the cup, said second pick-off coil assembly including means for coupling said second coil to a source of energizing current to establish a magnetic flux field; and (f) a second coil cover, said second coil cover consisting of a plate of non-magnetic material mounted within the second section of said central aperture of said housing between said second pick-off coil assembly and said diaphragm, said second coil cover having first and second parallel side surfaces, said first side surface of said second coil cover being in parallel alignment with said diaphragm and spaced apart therefrom, said second side surface of said second coil cover defining three spaced apart substantially rectangular depressions therein with a projecting tip of each one of the extending leg portions of said second core disposed within a different one of said depressions and spaced therefrom by an air gap, said second coil cover being peripherally sealed to said housing to thereby define a second pressure chamber between said second coil cover and said diaphragm with said second pressure ports terminating within said second pressure chamber, the spacing between the tips of the extending leg portions of said second coil core and said diaphragm being sufficiently close so that said diaphragm is within the magnetic field of said second coil to form a part of the magnetic circuit thereof.

5. A differential pressure transducer comprising, in combination:

(a) a pressure-tight housing defining a central aperture therein and first and second spaced apart pressure ports communicating between an exterior surface of said housing and said central aperture, the termination of each of said first and second pressure ports in an exterior surface of said housing including coupling means for the pressure-tight coupling thereto of fluid carrying lines;

(b) a flexible diaphragm of magnetic material disposed within said central aperture in said housing and peripherally sealed thereto to thereby divide said central aperture into, first and second sections, said first pressure port terminating in said first section at a point adjacent said diaphragm and said second pressure port terminating in said second section at a point adjacent said diaphragm;

(c) a first pick-off coil assembly mounted within the first section of said central aperture, said first pick-off coil assembly consisting of a first core of magnetic material having a base portion and central and end leg portions extending from said base portion toward said diaphragm, a first wire coil wound around the central leg portion and between the end leg portions of said first core, and a first cup-shaped coil receptacle encompassing said coil with the base portion of said first coil core disposed at the closed end of the cup and with the tips of the extending leg portions of said first coil core projecting from the open end of the cup, said first pick-off coil assembly including means for coupling said first coil to a source of energizing current to establish a magnetic flux field;

(d) a first coil cover, said first coil cover consisting of a plate of non-magnetic material mounted within the first section of said central aperture of said housing between said first pick-off coil assembly and said diaphragm, said first coil cover having first and second parallel side surfaces, said first side surface of said first coil cover being in parallel alignment with said diaphragm and spaced apart therefrom; said second side surface of said first coil cover defining three spaced apart substantially rectangular depressions therein with a projecting tip of each one of the extending leg portions of said first core disposed within a different one of said depressions and spaced therefrom by an air gap, said first coil cover being peripherally sealed to said housing to thereby define a first pressure chamber between said first coil cover and said diaphragm with said first pressure port terminating within said first pressure chamber, the spacing between the two tips of the extending leg portions of said first coil core and said diaphragm being sufficiently close so that said diaphragm is within the magnetic field of said first coil to form a part of the magnetic circuit thereof;

(e) a second pick-off coil assembly mounted within the second section of said central aperture, said second pick-off coil assembly consisting of a second core of magnetic material having a base portion and a central and leg portions extending from said base portion toward said diaphragm, a second wire coil wound around the central leg portion and between the end leg portions of said second core, and a second cup-shaped coil receptacle encompassing said coil with the base portion of said second coil core disposed at the closed end of the cup and with the tips of the extending leg portions of said second coil core projecting from the open end of the cup, said second pick-off coil assembly including means for coupling said second coil to a source of energizing current to establish a magnetic flux field; and, (f) a second coil cover, said second coil cover consisting of a plate of non-magnetic material mounted within the second section of said central aperture of said housing between said second pick-off coil assembly and said diaphragm, said second coil cover having first and second parallel side surfaces, said first side surface of said second coil cover being in parallel alignment with said diaphragm and spaced apart therefrom, said second side surface of said second coil defining three spaced apart substantially rectangular depressions therein with a projecting tip of each one of the extending leg portions of said second core disposed within a different one of said depressions and spaced therefrom by an air gap, said second coil cover being peripherally sealed to said housing to thereby define a second pressure chamber between said second coil cover and said diaphragm with said second pressure port terminating within said second pressure chamber, the spacing between the tips of the extending leg portions of said second coil core and said diaphragm being sufficiently close so that said diaphragm is within the magnetic field of said second coil to form a part of the magnetic circuit thereof.

6. A differential pressure transducer comprising, in combination:

(a) a first housing body having first and second opposed substantially planar faces, said first body defining a cylindrical aperture extending inwardly from said first face, said cylindrical aperture being surrounded by a contiguous annular shallow depression;

(b) a second housing body complementary to said first housing body and having first and second opposed substantially planar surfaces, said second body defining a cylindrical aperture extending inwardly from said first face, said cylindrical aperture being surrounded by contiguous annular depressions;

(c) a first pick-off coil assembly mounted within the cylindrical aperture in said first body, said first pick-off coil assembly consisting of a first core of magnetic material having a base portion and central and end portions extending from said base portion toward said first face, a first wire coil wound around the central leg portion and between the end leg portions of said first core, and a first substantially cup-shaped coil receptacle encompassing said coil with the base portion of said first coil core disposed at the closed end of the cup and with the tips of the extending leg portions of said first coil core projecting from the open end of the cup, said first pick-off coil assembly including means for coupling said first coil to a source of energizing current to establish a magnetic flux field;

(d) a first coil cover, said first coil cover being a plate of non-magnetic material disposed within the annular depression in said first face of said first body and sealed thereto, said first coil cover having first and second parallel side surfaces, said second surface of said first coil cover defining three spaced apart substantially rectangular depressions therein with a projecting tip of each one of the extending leg portions of said first core disposed within a different one of said depressions and spaced therefrom by an air gap;

(e) a second pick-off coil assembly mounted within the cylindrical depression in said second body, said second pick-off coil assembly consisting of a second core of magnetic material having a base portion and central and end leg portions extending from said base portion toward said first face, the second wire coil when wound around the central leg portion and between the end leg portions of said second core, and a second substantially cup-shaped coil receptacle encompassing said coil with the base portion of said second coil core disposed at the closed end of the cup and with the tips of the extending leg portions of said second coil core projecting from the open end of the cup, said second pick-off coil assembly including means for coupling said second coil to a source of energizing current to establish a magnetic flux field;

(f) a second coil cover, said second coil cover being a plate of non-magnetic material mounted within the shallow annular depression in said second body, said second coil cover having first and second parallel side surfaces, said second side surface of said second coil cover defining three spaced apart substantially rectangular depressions therein with a projecting tip of each one of the extending leg portions of said second core disposed within a different one of said depressions and spaced therefrom by an air gap;

(g) a flexible diaphragm of magnetic material, said first and second housing bodies being assembled in pressure-tight relationship with said diaphragm disposed between the first face of said first body and the first face of said second body and peripherally sealed thereto, said diaphragm being spaced sufficiently close to the first side surfaces of said first and second coil covers so that said diaphragm is within the magnetic fields of said first and second coils to form a part of the magnetic circuits thereof, said diaphragm thereby dividing the space between said coil covers into first and second pressure chambers;

(h) a first pressure port within said first body, said first pressure port communicating between said first pressure chamber and said second face, the termination of said first pressure port in said second face including means for the pressure-tight coupling thereto of fluid carrying lines; and, (i) a second pressure port in said second body, said second pressure port communicating between said second pressure chamber and said second face, the termination of said second pressure port in said second face including means for the pressure-tight coupling thereto of fluid carrying lines.

References Cited in the file of this patent

UNITED STATES PATENTS

| | | |
|---|---|---|
| 2,376,156 | Kuehni | May 15, 1945 |
| 2,509,210 | Clark | May 30, 1950 |
| 2,884,608 | Jessen | Apr. 28, 1959 |
| 2,927,290 | Baker | Mar. 1, 1960 |